US010974454B2

United States Patent
Schödel et al.

(10) Patent No.: US 10,974,454 B2
(45) Date of Patent: Apr. 13, 2021

(54) POWDER MODULE

(71) Applicant: CL SCHUTZRECHTSVERWALTUNGS GMBH, Lichtenfels (DE)

(72) Inventors: Frank Schödel, Kronach (DE); Jens Stammberger, Rödental (DE)

(73) Assignee: CONCEPT LASER GMBH, Lichtenfels (DE)

( * ) Notice: Subject to any disclaimer, the term of this patent is extended or adjusted under 35 U.S.C. 154(b) by 75 days.

(21) Appl. No.: 16/032,438

(22) Filed: Jul. 11, 2018

(65) Prior Publication Data

US 2019/0022939 A1 Jan. 24, 2019

(30) Foreign Application Priority Data

Jul. 21, 2017 (EP) .................................... 17182631

(51) Int. Cl.
*B29C 64/255* (2017.01)
*B22F 3/105* (2006.01)
*B33Y 30/00* (2015.01)
*B33Y 40/00* (2020.01)
*B29C 64/268* (2017.01)
*B29C 64/371* (2017.01)
*B01F 5/24* (2006.01)
*B01F 7/00* (2006.01)
(Continued)

(52) U.S. Cl.
CPC .............. *B29C 64/255* (2017.08); *B01F 5/24* (2013.01); *B01F 7/00316* (2013.01); *B22F 3/1055* (2013.01); *B29C 64/268* (2017.08); *B29C 64/371* (2017.08); *B33Y 30/00* (2014.12); *B33Y 40/00* (2014.12); *B22F 2003/1056* (2013.01); *B22F 2999/00* (2013.01); *B29C 64/153* (2017.08); *B33Y 10/00* (2014.12)

(58) Field of Classification Search
CPC ... B29C 64/255; B29C 64/259; B29C 64/321; B29C 64/329; B65D 83/06; B65D 88/26
See application file for complete search history.

(56) References Cited

U.S. PATENT DOCUMENTS 9,067,377 B2 * 6/2015 Dickinger ............. B30B 15/304
9,776,362 B2 10/2017 Chuang et al.
(Continued)

FOREIGN PATENT DOCUMENTS

CN 101850615 A 10/2010
CN 103025507 A 4/2013
(Continued)

OTHER PUBLICATIONS

EPO machine translation of DE 102012008664, retrived Mar. 9, 2020 (Year: 2013).*
(Continued)

*Primary Examiner* — Timothy Kennedy
(74) *Attorney, Agent, or Firm* — Dority & Manning, P.A.

(57) ABSTRACT

Powder module (1, 15, 24) for an apparatus for additively manufacturing of three-dimensional objects, comprising a powder chamber (2) defining a powder room (3), which is fillable with building material (4) in powder form and a cover (5) defining the powder room (3) at its top, whereby the powder module (1, 15, 24) comprises at least one equalization unit (7), configured for spreading the building material (4) inside the powder room (3).

13 Claims, 4 Drawing Sheets

Figure 1:
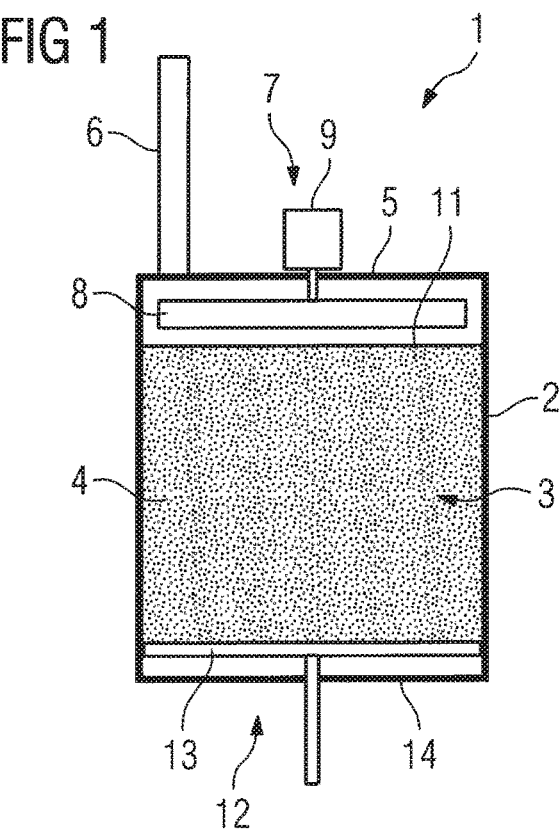

(51) Int. Cl.
B33Y 10/00 (2015.01)
B29C 64/153 (2017.01)

(56) References Cited

U.S. PATENT DOCUMENTS

| | | |
|---|---|---|
| 10,265,912 B2 | 4/2019 | Herzog et al. |
| 10,357,827 B2 | 7/2019 | Shaw et al. |
| 2001/0045678 A1 | 11/2001 | Kubo et al. |
| 2010/0247703 A1 | 9/2010 | Shi et al. |
| 2012/0107438 A1 | 5/2012 | Bokodi et al. |

FOREIGN PATENT DOCUMENTS

| | | |
|---|---|---|
| CN | 106395408 A | 2/2017 |
| CN | 205915701 U | 2/2017 |
| CN | 206151878 U | 5/2017 |
| DE | 102012008664 A1 | 11/2013 |
| EP | 1700686 A2 | 9/2006 |
| JP | 2001/334583 A | 12/2001 |
| JP | 2013/532592 A | 8/2013 |
| TW | 201615388 A | 5/2016 |

OTHER PUBLICATIONS

European Search Report Corresponding to Application No. 17182631 dated Dec. 6, 2017.
Machine Translated Japanese Office Action Corresponding to Application No. 2018000689 dated Jan. 16, 2019.
Chinese Combined Search Report and Office Action Corresponding to Application No. 201711190437 dated Dec. 17, 2019.
Chinese Search Report Corresponding to Application No. 201711190437 dated Oct. 30, 2020.

* cited by examiner

POWDER MODULE

CROSS-REFERENCE TO RELATED APPLICATIONS

This application claims priority to European Patent Application serial no. 17 182 631.6 filed Jul. 21, 2017, the contents of which is incorporated herein by reference in its entirety as if set forth verbatim.

The invention relates to a powder module for an apparatus for additively manufacturing of three-dimensional objects, comprising a powder chamber defining a powder room, which is fillable with building material in powder form and a cover defining the powder room top side.

Powder modules of that kind are well known and established in the prior art. Powder module in the sense of the invention means a dose module for conveying building material into a process chamber of an apparatus for additive manufacturing as well as an overflow module for collecting the surplus building material conveyed from the process chamber. The powder module may contain building material in powder form, which is housed in the powder room. The powder room is defined by walls and the bottom side of the powder chamber, whereby the powder room is covered topsides by a cover or top cover. Further such powder modules preferably comprise a filling unit for filling building material into the powder room. Typically, such a filling unit is arranged around the top cover, which defines the powder room at its top. The filling unit is thereby configured to fill or refill building material into the powder room, so that the powder module can be reused after the building material has been (partially) consumed. Therefore, an operator can fill or refill building material via the filling unit, if a filling level of building material has fallen below a predetermined filling level.

Normally, building material that is filled into the powder room via the filling unit is not distributed equally, as the building material, being poured into the powder room, is normally depleted through one hole or opening in the top cover and accumulates at one location inside the powder room. The location where the building material accumulates inside the powder room depends on the geometry and position of the opening. This typically leads to an unequal, for example a cone-like or a tapered accumulation of building material inside the powder room. Therefore, the powder room is not used efficiently, as the building material inside the powder room is not distributed equally, but accumulated on a tapered pile. Therefore, volume of the powder room is wasted, as not the entire volume is available to store building material. In other words, the powder room is not entirely filled with building material as the top section of the powder room merely contains the peak of the cone-like pile. This leads to a free volume, thus, the entire volume of the powder room is not used efficiently.

To overcome this problem, it is suggested in the prior art to have a movable element, that bounds the powder room at the bottom, whereby the movable element carries the building material stored inside the powder room. The movable element can be moved upwards and downwards, so that the building material can be pushed against the top cover and therefore the cone-like or tapered shape of the pile of building material can be equalized in part.

Disadvantageously, the distribution of building material is still not equal after pushing the building material against the top cover. Further the building material is pushed and packed inhomogeneously. Additionally, owing to the further step of pushing the building material against the top cover, the powder room cannot be used entirely, as still a part of the powder room must be held available to move the movable element inside the powder room and to push the building material against the top cover.

Therefore, it is an object of the present invention to provide a powder module which is configured to distribute the building material inside the powder room more equal.

The object is achieved by a powder module according to claim 1.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

Divergent from the powder module known from the state-of-the-art, where the building material is pushed or pressed against the top cover of the powder module to achieve a more equal distribution, the present invention suggests a separate equalization unit that is configured for spreading the building material inside the powder room. Thereby, it can be assured, that the building material inside the powder room is distributed equally, so that the accumulation of building material, for example in cone-like or tapered pile can be reduced, avoided or equalized. By way of the invention it is made possible, to use the powder room more efficiently, as the building material inside the powder room is distributed more equal. Therefore, the filling level of building material inside the powder room can be higher than in powder modules as known from prior art, as the building material is not distributed unequally, but distributed with a homogenous filling level. Consequently, the powder chamber can be filled with building material to a higher filling level, whereby the top surface of building material is plane and even and does not form a cone-like or tapered pile. Therefore, the powder room can be used nearly entirely, as there is no need for holding available a part of the powder room. Instead the building material can be filled into the powder room and distributed equally by the equalization unit until the filling level is reached.

According to a preferred embodiment of the present invention, the equalization unit comprises at least one equalization element arranged on the side of the cover facing the powder room, whereby the building material is spreadable in at least one section of the powder room. Therefore, the at least one equalization element, that is part of the equalization unit, is arranged inside the powder room, in particular, on the side of the cover facing the powder room. Therefore, the equalization element is located above the building material that is stored in the powder room. The equalization element is configured to spread the powdery building material in at least one section of the powder room, as a result, the building material that is filled into the powder room can be spread in a defined way by the equalization element, so that the building material is distributed equally inside the powder room. Preferably, the equalization element has an elongated shape, whereby a long side of the equalization element is arranged in parallel to the cover or the bottom, essentially.

It is particularly preferred, that the at least one equalization element is movable, whereby the building material is spreadable in the powder room by a driven movement of the at least one equalization element. According to this embodiment of the present invention the at least one equalization element is movable, whereby as a consequence of the driven movement the building material is distributed or redistributed inside the powder room. Preferably, the building material can according to this embodiment be conveyed by the equalization element, whereby the equalization element can also be used to redistribute building material that has already been filled into the powder room and has formed a cone-like or a tapered pile and it is also possible to use the equalization element to distribute building material uniformly as it flows into the powder room. By way of the second alternative it is assured that the building material does not form an unequal distribution, for example a cone-like or a tapered pile, but it is distributed equally, so that a plane surface of building material is formed.

Another preferred embodiment of the present invention suggests that the equalization element is drivable by at least one driving unit or by building material flowing into the powder chamber. This preferred embodiment is based on the idea that the equalization element according to the first alternative is driven by a driving unit, for example comprising a gear mechanism or a transmission, respectively, and/or a motor. Thereby, the motor drives the equalization element directly or via the transmission, whereby the equalization element conveys and distributes or redistributes the building material inside the powder room. According to the second alternative, the building material flowing into the powder chamber drives the at least one equalization element. Thereby, the kinetic energy of the building material, that is flowing into the powder chamber, is partially transferred to the at least one equalization element, which is thereby caused to move. The movement of the equalization element therefore, leads in both alternatives to the distribution of the building material. In the first alternative, a redistribution of building material is also possible, as described above.

This embodiment of the present invention can further be improved in that a filling unit for filling building material into the powder room is provided, wherein the filling unit comprises at least one sealable opening configured to guide building material flowing into the powder chamber on the at least one equalization element or a drive device connected with the at least one equalization element to drive the at least one equalization element. Thus, the filling unit comprises an opening that is sealable so that the inside of the powder chamber can be separated from the outside and the opening can be sealable opened to fill building material into the powder chamber. The sealable opening is preferably designed in such a way that building material that flows into the powder chamber through the opening is guided on the at least one equalization element or on a drive device connected with the at least one equalization element. Through the transfer of kinetic energy from the building material flowing on the drive device or flowing directly on the equalization element the equalization element is driven, whereby the building material is distributed equally inside the powder room because of the movement of the equalization element.

According to another preferred embodiment of the present invention, the at least one equalization element is arranged on an eccentric drive or an eccentric mount. Consequently, the equalization element is moved eccentrically and therefore covers a wider area of movement inside the powder room. Based on the eccentric movement of the equalization element it can be ensured that the distribution of building material is more homogenous and the building material is distributed more equally, as there is no preferred direction of flow of the building material as it is conveyed by the equalization element. Centric in the sense of the invention means a symmetric arrangement with respect to the powder chamber, wherein the equalization element is arranged essentially in parallel to the cover or the bottom, respectively.

Another preferred embodiment of the present invention suggests that the at least one equalization element is movable translatory along an axis relative to at least one section of the powder chamber and/or rotatable about an axis. Thus, the equalization element can be moved relative to this section of the powder chamber. For example the equalization element can be moved along the top cover and/or parallel to at least one wall of the powder module and can distribute or redistribute the building material inside the powder chamber. Therefore the at least one equalization element is moved linearly between two sides, walls or sections of the powder chamber and conveys the building material, for example like a rake.

According to the other alternative of this embodiment of the present invention, the at least one equalization element is rotatable about an axis or at least one axis, respectively. The axis is preferably perpendicular to the top or the bottom surface of the powder chamber, whereby the building material is conveyed by the equalization element as the equalization element is rotated about the axis. Of course, the equalization element can be rotatable about more than one axis in particular the equalization element can be arranged on an eccentric drive or an eccentric mount. Thereby, the movement of the equalization element can be composed of various linear and rotating movements, in particular rotating movements about two or more axes. Further, it is possible that the powder module comprises more than one equalization element, whereby the movement of each of the equalization elements is composed of at least one linear and/or at least one rotating movement.

Particularly preferred it is suggested that the equalization element is movable between two walls of the powder chamber. Thus, for example the equalization element can be moved alongside the top cover and/or parallel to at least one wall of the powder module and distribute or redistribute the building material inside the powder chamber. Therefore the at least one equalization element is moved linearly between two sides or walls of the powder chamber and conveys the building material for example like a rake.

Further, it can be preferred that the at least one equalization element is movable relative to the cover. Therefore, the building material flowing into the powder chamber through an opening in the cover can be distributed by the equalization element that is moved relative to the cover. It is also possible to redistribute the building material that has flown into the powder chamber by a movement of the at least one equalization element, that is moved relative to the cover. Through the movement relative to the cover the accumulation of building material that has formed inside the powder room, based on the position of the opening and flow of building material, can be redistributed homogeneously.

According to another preferred embodiment of the present invention the at least one equalization element comprises at least one blade and/or at least one blade portion. The at least one equalization element contacts the building material via the blade and conveys the building material. The shape of the blade can be adjusted dependent on the position of the opening and/or the flow of building material into the powder chamber. In particular, the pitch of the blade and/or the length and/or the width of the blade of the at least one equalization element can be adjusted or selected accordingly.

A further embodiment of the present invention preferably suggests that the at least one equalization element comprises at least one curved section. The at least one curved section of the equalization element can be adjusted according to the desired distribution of building material or the distribution of building material flowing into the powder chamber, respectively. For example, the curved section can be located at the at least one blade of the at least one equalization element, whereby the building material can be conveyed, distributed or redistributed according to the curvature of the at least one equalization element. Preferably, the at least one equalization element is curved symmetrically, for example in the shape of a rotor, whereby the equalization element comprises at least two blades with defined curvature.

According to another embodiment of the present invention, the powder module preferably comprises a carrying unit defining the powder room bottom with a movable carrying element, whereby the volume of the powder room is variable dependent on the position of the carrying element. The carrying element bounds the powder room bottom sides, whereby the carrying element is movable relative to the powder chamber. In particular, the carrying element can be moved upwards and downwards inside the powder room, whereby the powder room volume depends on the position of the carrying element.

The carrying element can further be used to move building material filled into the powder room, to convey the building material towards the at least one equalization element that is, for example, located at the top cover. The building material can therefore be conveyed towards the at least one equalization element and can be redistributed by the at least one equalization element.

The carrying element can further preferably be set in oscillation by an oscillation unit to spread the building material inside the powder room. As a result of the oscillation of the carrying element the building material resting on the carrying element is set in oscillation as well, whereby an inhomogeneous distribution of building material can be equalized.

It is particularly preferred that the building material inside the powder chamber is movable towards the at least one equalization element by moving the carrying element. As the powder module can be used as a dose module, the carrying element can therefore, be used to convey the building material towards the top side of the powder chamber, as throughout the building process building material is conveyed from the top side and used to manufacture three-dimensional objects the building material is moved upwards according to the consumption of building material in the building process.

Preferably, the building material is spreadable equally with respect to a bottom surface and/or a cover inside the powder chamber. Therefore, an equal distribution within the sense of the invention is a distribution of building material with a plane surface in particular parallel to the bottom and/or the cover of the powder chamber.

Additionally, the invention relates to an apparatus for additively manufacturing of three-dimensional objects by successively and selectively exposing layers of building material in powder form with an energy beam in conjunction with successive and selective solidification of the exposed parts of the layers of building material, whereby the apparatus comprises at least one inventive powder module. Of course, the features, advantages and details described with respect to the inventive powder module are entirely transferable to the inventive apparatus.

Figure 2:
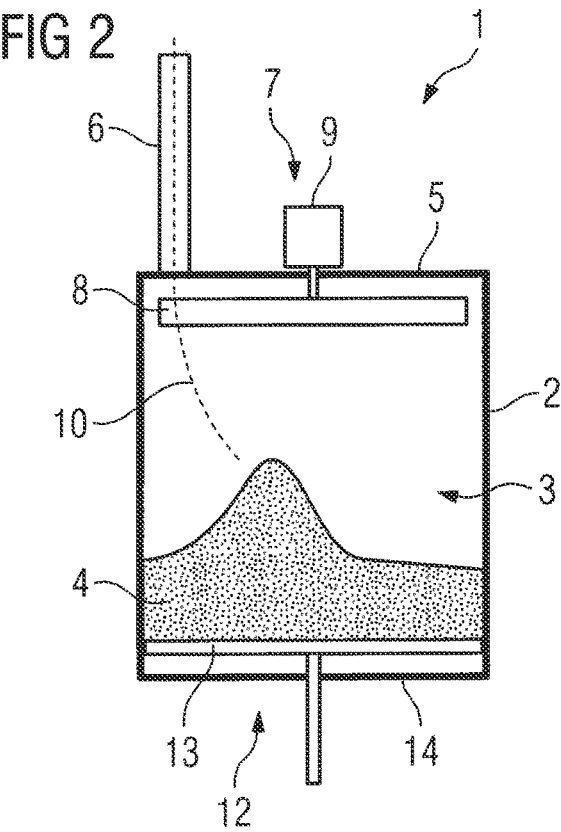
Figure 3:
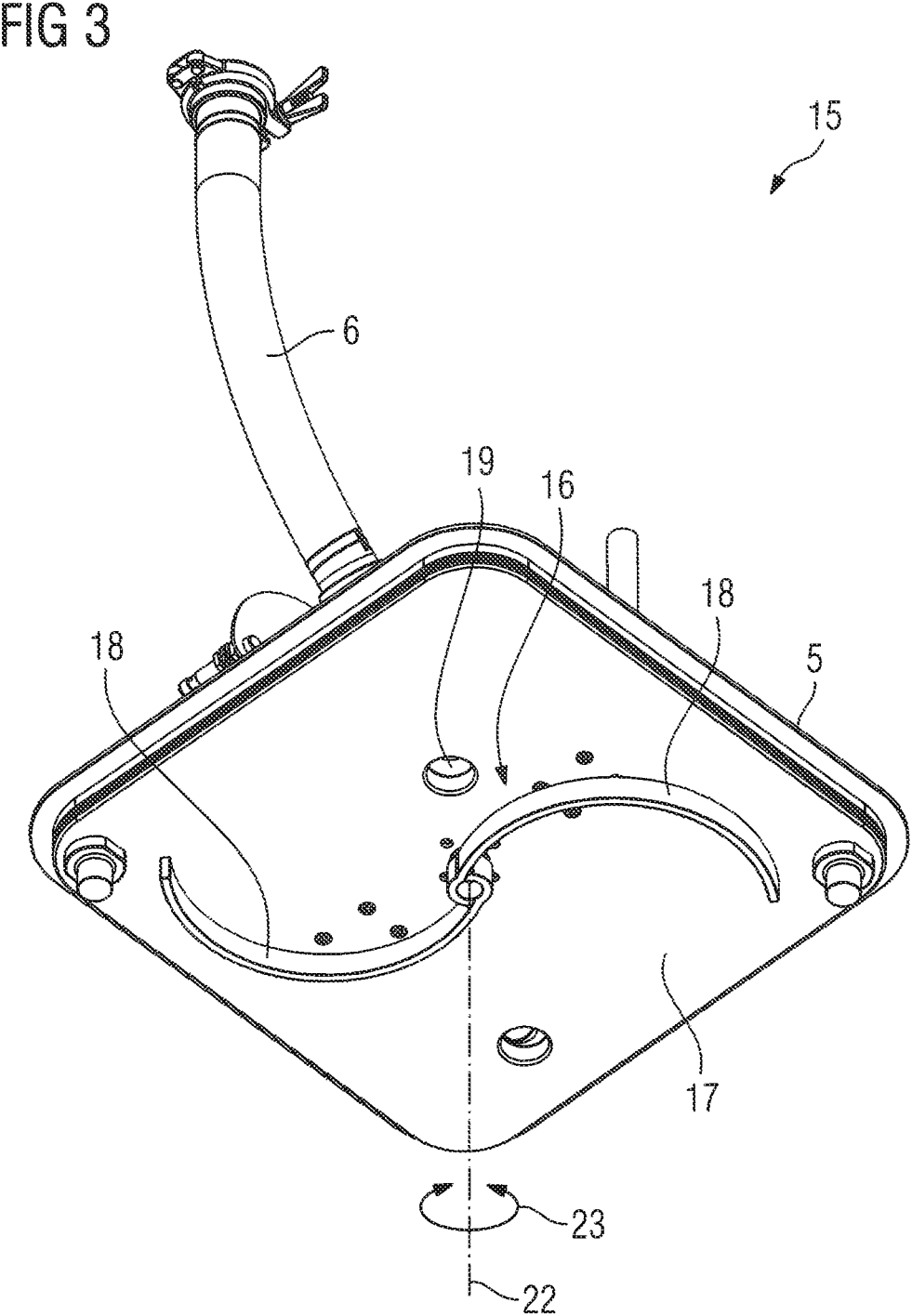
Figure 4:
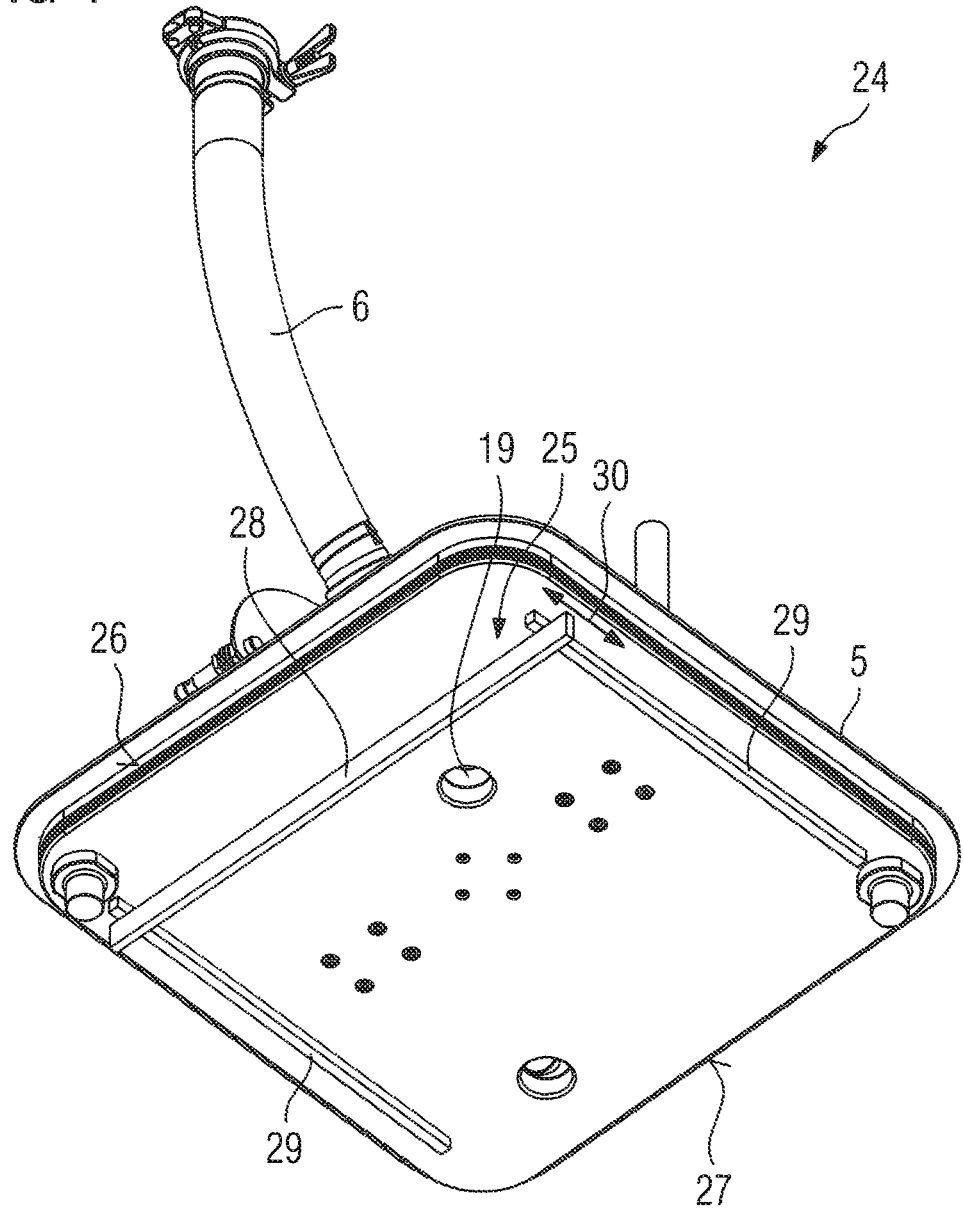
Figure 5:
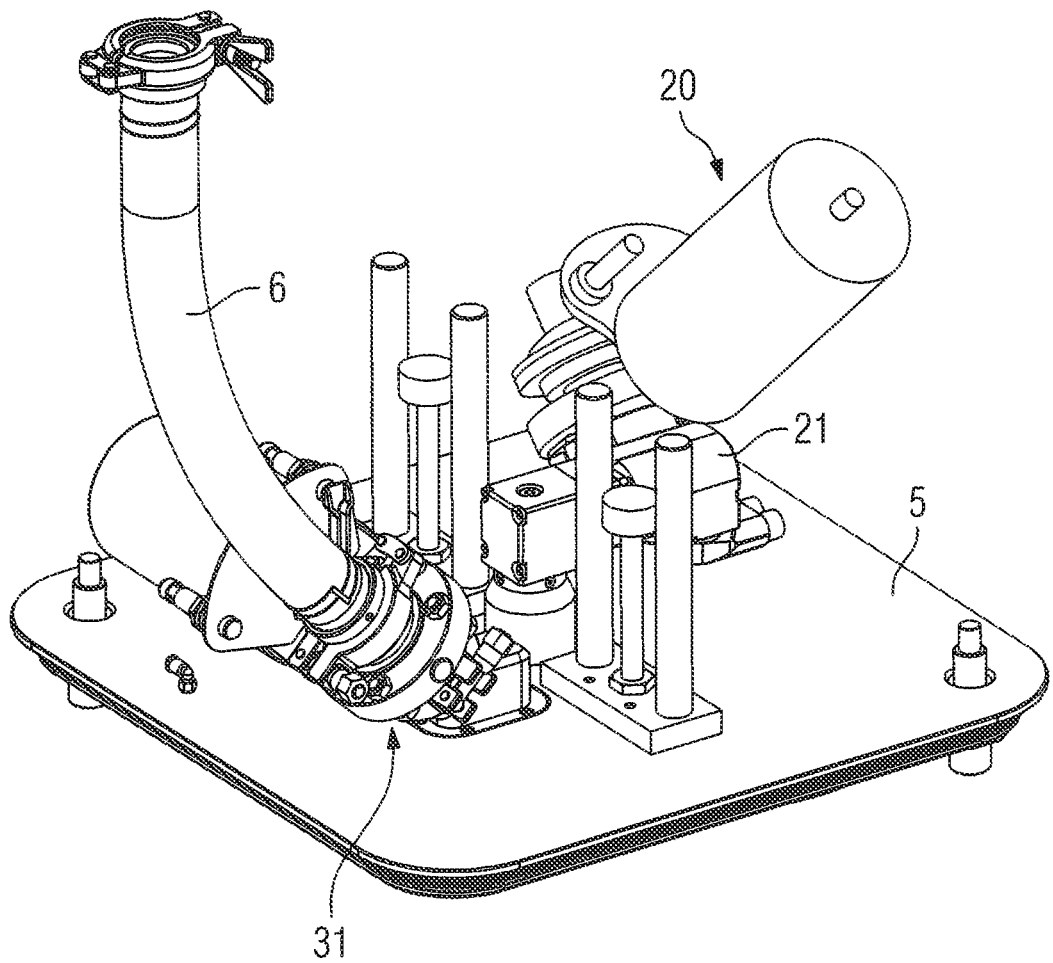

Exemplary embodiments of the invention are described with reference to the Fig., whereby FIG. 1 a schematic view of an inventive powder module;

FIG. 2 the schematic view of FIG. 1 with an inhomogeneous distribution;

FIG. 3 a perspective view of a part of a powder module according to a first embodiment;

FIG. 4 a perspective view of a part of a powder module according to a second embodiment; and FIG. 5 a perspective view of the top of a powder module.

FIG. 1 shows a powder module 1 for an apparatus for additively manufacturing of three-dimensional objects [not shown], comprising a powder chamber 2 defining a powder room 3, which is fillable or filled with building material 4 in powder form, a cover 5 defining the powder room 3 topsides, and a filling unit 6 for filling building material 4 into the powder room 3, whereby the powder module 1 comprises an equalization unit 7 configured for spreading the building material 4 inside the powder room 3. The scene depicted in FIG. 1 shows that the equalization unit 7 comprises an equalization element 8 that is driven by a driving unit 9, for example via a transmission by an electric motor [see FIG. 4].

FIG. 2 shows the powder module 1 from FIG. 1, whereby building material 4 is filled into the powder room 3 through the filling unit 6. The flow of building material 4 into the powder room 3 is depicted via a dashed line 10. As can be seen from FIG. 2 the flow of building material 4 into the powder chamber 2 forms an unequal distribution of building material 4 inside the powder room 3. The building material 4 forms an unequal, for example a cone-like or a tapered pile, respectively. To distribute or redistribute the building material 4 inside the powder room 3 the equalization element 8 can be driven via the driving unit 9. The driven movement of the equalization element 8 can for example result in a rotation of the equalization element 8 about an axis and/or a linear movement of the equalization element 8 relative to the powder chamber 2 to distribute the building material 4 equally, as will be described in detail below. In FIG. 1 is shown, that the building material 4 is distributed equally, so that a surface 11 of the building material 4 is plane and even with respect to the cover 5 of the powder module 1.

To have the building material 4 distributed equally inside the powder room 3 the equalization element 8 can be driven to convey the building material 4 filled into the powder room 3 via the filling unit 6 to spread the powdery building material 4 equally inside the powder room 3, when the building material 4 is filled into the powder room 3. It is also possible to start with an unequal distribution of building material 4, as shown in FIG. 2, that can be redistributed or equalized. Therefore, the powder module 1 comprises a carrying unit 12 defining the powder room bottom with a movable carrying element 13. As a result, the volume of the powder room 3 depends on the position of the carrying element 13 as it can be moved between at least two positions upwards and downwards for example between the cover 5 and a bottom surface 14 of the powder chamber 2. Therefore, the building material 4 that has been filled into the powder room 3 unequally can be moved via the carrying unit 12 in particular via the carrying element 13 upwards and towards the equalization element 8. Therefore, the moving equalization element 8 conveys the cone-like shape of building material 4 and creates an equal distribution of the building material 4. It is also possible to have the building material 4 directly spread, when flowing into the powder room 3 via the filling unit 6. It is also possible to set the carrying element 13 in oscillation to redistribute the building material 4 equally.

Alternatively, it is also possible that the equalization element 8 is driven by the building material 4 that is filled into the powder room 3 via the filling unit 6. Thereby the building material 4 transfers kinetic energy on the equalization element 8 and therefore creates movement of the equalization element 8 that distributes the flowing building material 4 inside the powder room 3.

FIG. 3 shows a perspective view of a part of a powder module 15 which is similarly built to the powder module 1 of the FIGS. 1 and 2. Therefore the same numerals are used for the same parts. As depicted in FIG. 3 the powder module 15 comprises a cover 5 and a filling unit 6 [see FIG. 5]. The powder module 15 comprises an equalization unit 7 with an equalization element 16. The equalization element 16 is arranged on a side 17 of the cover 5 that is facing the inside of the powder room 3 [not shown]. As can be seen further from FIG. 3 the equalization element 16 comprises two blades 18 that are curved in a "C-shape". If building material 4 flows through a sealable opening 19 in the cover 5 the building material 4 is distributed equally via the equalization element 16. Therefore, the equalization element 16 is driven by a motor 20 via a transmission 21. The equalization element 16 is rotatable about an axis 22 as depicted by a double arrow 23. It is of course also possible to have the equalization element 16 attached to an eccentric mount or eccentrically mounted. The opening 19 can further be designed in a way, that building material 4 flowing into the powder room 3 is guided on the equalization element 16 so that the equalization element 16 is driven and distributes the building material 4 flowing into the powder room 3 equally.

FIG. 4 shows a perspective view of a part of a powder module 24 which is built similarly to the powder module 1 shown in FIGS. 1 and 2. Therefore, the same numerals are used for the same parts. Diverging from the powder module 15 shown in FIG. 3 the powder module 24 comprises an equalization element 25 that is movable linearly between two sides or walls 26, 27 of the powder module 24. The linear movement of the equalization element 25 is depicted via a double arrow 30. The equalization element 25 comprises one blade 28 that is movable along two guides or guide rails 29. Building material 4 flowing through the opening 19 into the powder room 3 can be distributed or redistributed equally via the movement of the equalization element 25. The equalization element 25 can be moved along the guide rails 29 to convey the building material 4 inside the powder chamber 2, whereby the equalization element 25 is moved like a rake between the walls 26 and 27.

FIG. 5 shows a perspective view of a cover 5 for example for one of the powder modules 1, 15 and 24 whereby an electric motor 20 is connected to the respective equalization element 8, 16, 25 via a transmission 21. Of course, it is also possible to connect the equalization element 8, 16 directly to the electric motor 20 or to connect the motor 20 directly or indirectly to an eccentric mount. FIG. 5 further shows, that the filling unit 6 comprises a seal 31 so that the powder room 3 can be sealable opened to refill building material 4 into the powder room 3.

Self-evidently the single embodiments shown in the FIGS. 1 to 5 can be combined. In particular, all technical features, advantages and details can be transferred between the single embodiments. It is further possible to have an eccentric mount or the equalization elements 8, 16, 25 eccentrically mounted inside the powder room 3.

The invention claimed is:

1. A powder module for an apparatus for additively manufacturing of three-dimensional objects, the powder module comprising:
    a powder chamber defining a powder room, the powder room fillable with building material in powder form;
    a cover defining the powder room at its top;
    at least one equalization unit configured for spreading the building material inside the powder room, wherein the at least one equalization unit comprises at least one equalization element that is movable independent of and arranged on a side of the cover facing the powder room; and
    a carrying element defining a bottom surface of the powder room, wherein a driven movement of the at least one equalization element is configured to distribute the building material equally to form a plane surface of the build material parallel to the bottom surface.

2. The powder module according to claim 1, wherein the equalization element is drivable by at least one driving unit or by building material flowing into the powder chamber.

3. The powder module according to claim 2, further comprising a filling unit for filling building material into the powder room, wherein the filling unit comprises at least one sealable opening configured to guide building material flowing into the powder chamber on the at least one equalization element or a drive device connected with the at least one equalization element to drive the at least one equalization element.

4. The powder module according to claim 1, wherein the at least one equalization element is arranged on an eccentric drive or an eccentric mount.

5. The powder module according to claim 1, wherein the at least one equalization element is movable translatory along an axis relative to at least one section of the powder chamber and/or rotatable about an axis.

6. The powder module according to claim 1, wherein the at least one equalization element is movable between two walls of the powder chamber.

7. The powder module according to claim 5, wherein the at least one equalization element is movable relative to the cover.

8. The powder module according to claim 1, wherein the at least one equalization element comprises at least one blade and/or at least one blade portion.

9. The powder module according to claim 1, wherein the at least one equalization element comprises at least one curved section.

10. The powder module according to claim 1, further comprising a carrying unit defining the powder room bottom with a movable carrying element, whereby the volume of the powder room is variable dependent on a position of the carrying element.

11. The powder module according to claim 10, wherein the carrying element further comprises an oscillator.

12. The powder module according to claim 1, wherein the building material is spreadable equally with respect to a bottom and/or the cover inside the powder chamber so as to form a uniform and/or plane surface.

13. An apparatus for additive manufacturing of three-dimensional objects by successively and selectively exposing layers of building material in powder form with an energy beam in conjunction with successive and selective solidification of the exposed parts of the layers of building material, comprising at least one powder module according to claim 1.

* * * * *